United States Patent
Leclerc et al.

(10) Patent No.: US 6,449,113 B1
(45) Date of Patent: Sep. 10, 2002

(54) DEVICE FOR READING MAGNETIC INFORMATION

(75) Inventors: Patrick Leclerc; Eric Pieraerts, both of Caen; Joao N. V. L. Ramalho, Biéville-Beuville; Jean Barbotin, Caen, all of (FR); Johannes O. Voorman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/356,597

(22) Filed: Jul. 19, 1999

(30) Foreign Application Priority Data

Jul. 17, 1998 (FR) .............................................. 98 09160

(51) Int. Cl.[7] .............................. G11B 5/03; G11B 5/02
(52) U.S. Cl. ............................................ 360/66; 360/67
(58) Field of Search ................................. 360/66–68, 46

(56) References Cited

U.S. PATENT DOCUMENTS

| 4,075,671 A | * | 2/1978 | Cheatham et al. ............ 360/66 |
| 5,877,911 A | * | 3/1999 | Klaassen et al. ............... 360/67 |
| 6,111,717 A | * | 8/2000 | Cloke et al. ................... 360/67 |

FOREIGN PATENT DOCUMENTS

EP            0829733 A2        3/1998

\* cited by examiner

*Primary Examiner*—Regina N. Holder
(74) *Attorney, Agent, or Firm*—Laurie E. Gathman

(57) ABSTRACT

A device for reading magnetic information, having at least one read head including at least one magnetoresistive bar MR for generating data pulses representative of information read by the head. To enable the bar to be biased accurately without requiring a measurement of the quiescent resistance of the bar, the device includes a control loop for controlling the power dissipated in the magnetoresistive bar, the control loop having a time constant which is large with respect to the duration of the data pulses.

11 Claims, 2 Drawing Sheets

DEVICE FOR READING MAGNETIC INFORMATION

Figure 1:
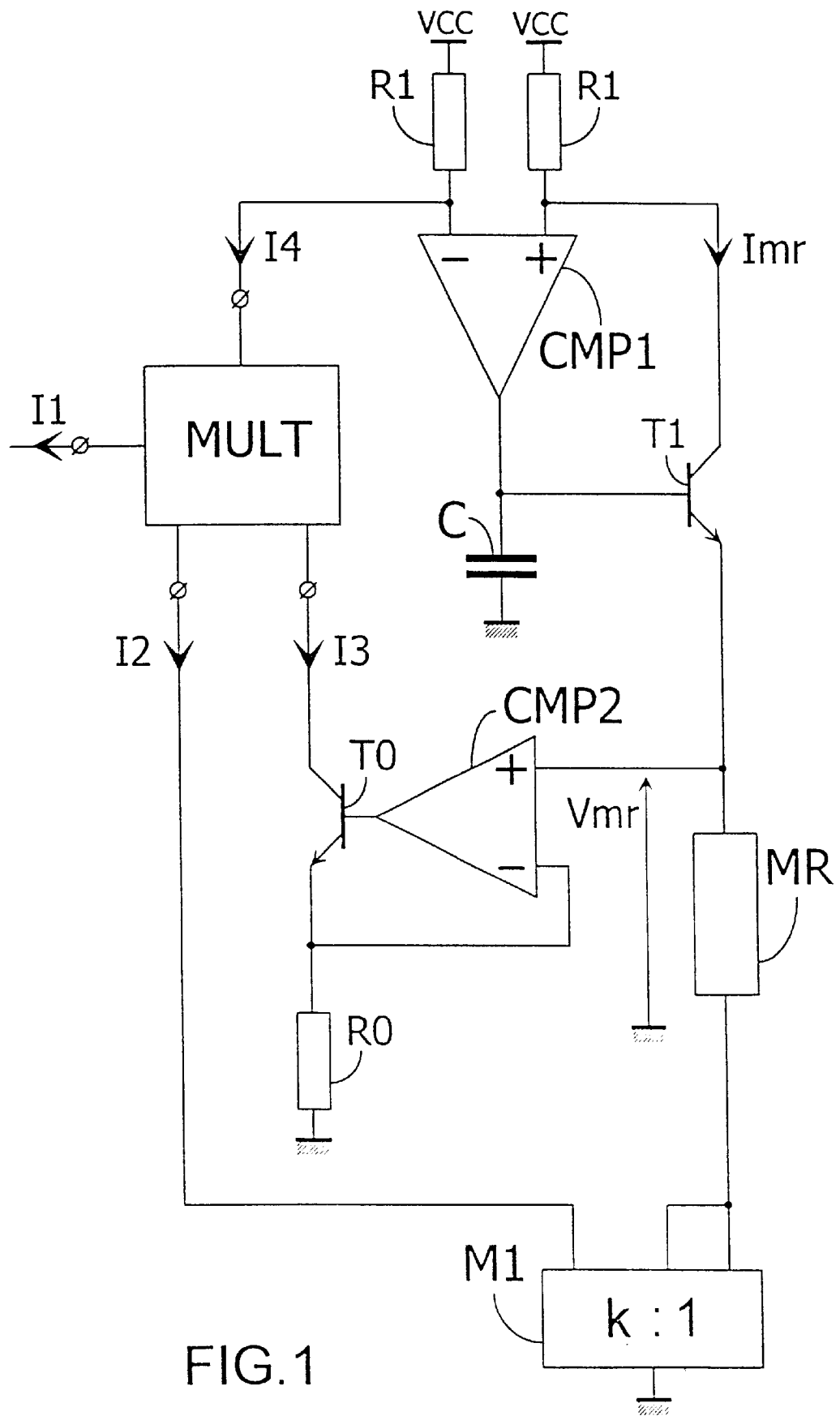

The present invention relates to a device for reading magnetic information, which device has at least one read head comprising at least one magnetoresistive bar intended for generating data pulses which represent information read by the head.

Such reading devices are commonly used for reading information stored on hard disks for computers. These disks generally have a magnetosensitive surface which is to be scanned by the read head. A rotary movement is imparted to the disk, while the read head is coupled to an arm which imparts a radial movement to the head. The disk surface is divided into a multitude of sub-surfaces in which a local magnetic field exists whose sign represents an item of binary information.

The operation of customary reading devices is based on the fact that when a magnetoresistive bar is exposed to a magnetic field its resistance varies.

In the majority of existing magnetic information reading devices the magnetoresistive bar is biased either by means of a d.c. bias current of predetermined value which flows through said bar, in which case the resistance variation generates a voltage pulse, or by means of a d.c. bias voltage of predetermined value applied across said bar, in which case said resistance variation generates a current pulse.

In the two afore-mentioned cases the amplitude of the generated pulses, called data pulses will be higher as the predetermined value, is higher. Therefore, it may seem advantageous to choose the predetermined value as high as possible in order to obtain a signal-to-noise ratio which is as high as possible. However, the predetermined value also dictates the power to be dissipated by the magnetoresistive bar. Thus, a predetermined value which is too large may lead to premature wear of the magnetoresistive bar as a result of an excessive permanent dissipation owing to the Joule effect. Moreover, the high amplitude of the data pulses resulting from such a choice may cause the appearance of power pulses is too high to be dissipated by the bar without damage and may lead to the destruction of the latter. Thus, the choice of the predetermined value appears to be a matter of a compromise between, on the one hand, an optimum signal-to-noise ratio for the data pulses and, on the other hand, a minimization of the wear and the risk of breakdown of the magnetoresistive bar, i.e. a minimization of the power dissipated by said bar.

In the present state of the art various methods of selecting the predetermined value are used, which all make use of the value assumed by the resistance of the magnetoresistive bar when this bar is not exposed to any magnetic information. Indeed, this value, referred to as the quiescent resistance, is essential for calculating, on the one hand, the amplitude which the data pulses will have and, on the other hand, the power dissipated in the bar. Thus, the value of the quiescent resistance is considered to be indispensable for determining the best compromise in accordance with the principle expounded above.

The known reading devices therefore include a system for measuring the quiescent resistance, which is usually intricate and which requires a substantial area of silicon for its implementation in integrated form as well as a considerable time for carrying out the actual measurement. The measurement of the quiescent resistance thus requires additional cost both in the fabrication of the reading device and in use.

It is an object of the invention to solve these problems by providing a magnetic information reading device in which the biasing of the magnetoresistive bar does not require a prior measurement of the quiescent resistance.

To this end, according to the invention, a magnetic information reading device of the type defined in the opening paragraph is characterized in that it includes a control loop for controlling the power dissipated in the magnetoresistive bar, the control loop having a time constant which is large with respect to the duration of the data pulses.

In such a reading device it is no longer a question of measuring the quiescent resistance and of deriving from this an optimum predetermined value for a bias voltage or current. On the contrary, it suffices to choose an optimum value for the power to be dissipated by the magnetoresistive bar, the control loop automatically controlling the operating conditions of said bar in such a manner that it effectively dissipates this power. The fact that the time constant of the control loop is large with respect to the duration of the data pules, enables to avoid that the loop distorts these pulses by attempting to subject them to an inappropriate control. Thus, only the d.c. parameters which govern the biasing of the bar are controlled. The data pulses are not affected by the power control, as a result of which the information represented by them is free from any alteration.

In an embodiment of the invention includes regulating means for simultaneously regulating the value of a current flowing through the magnetoresistive bar and the value of a voltage present across said bar, the control loop being controlled by a control signal whose value is representative of a regulated value of the power which is to be dissipated by said bar.

This structure of the control loop enables the regulated value to be determined simply by the choice of the control signal which controls said loop via the regulating means.

In a special embodiment of the invention the control loop includes a current multiplier arranged to receive a first current representative of the control signal, a second current representative of the current flowing through the magnetoresistive bar, and a third current representative of the voltage present across said bar, which multiplier is intended for generating a fourth current having a value whose square is proportional to the quotient between the values of the second and third currents, multiplied by the value of the first current.

It will be demonstrated hereinafter that the current multiplier enables to generate a signal, formed by the fourth current, whose value is independent of the electrical parameters which govern the operation of the device and, particularly, of the bias current and voltage of the magnetoresistive bar. This signal, which is exclusively representative of the regulated value and the quiescent resistance, enables to easily control the regulating means.

In an advantageous embodiment of the invention, the regulating means comprise a comparator intended for supplying an output signal representative of the difference between the fourth current and the current flowing though the magnetoresistive bar, and a transistor, whose conduction is controlled by the output signal of the comparator, which transistor has its main current path arranged in series with the magnetoresistive bar.

This structure of the regulating means, which is advantageous because of its simplicity, enables the bias current and voltage to be controlled simultaneously solely by means of the fourth current.

In a variant of this embodiment, the control loop includes a capacitive element intended for storing the value of the output signal of the comparator, which capacitive element has a value which is large enough to achieve that the duration of the data pulses is negligible with respect to the time constant of the control loop thus obtained.

The storage of the output signal of the comparator enables to lock the settings obtained during controlling. Moreover, the time constant of the control loop in the present embodiment depends on the value of the capacitive element. Therefore, it suffices to influence this value in order to adjust said time constant.

In a preferred embodiment of the invention, the control signal being of a digital nature, the control loop includes a register intended for storing the value of the control signal, and a digital-to-analog converter intended for receiving the content of said register and for converting said content into an analog current forming the first current.

This preferred embodiment of the invention enables to program the regulated value digitally, which is particularly advantageous in applications in the field of hard disks for computers, in which information is conveyed in digital form.

Figure 2:
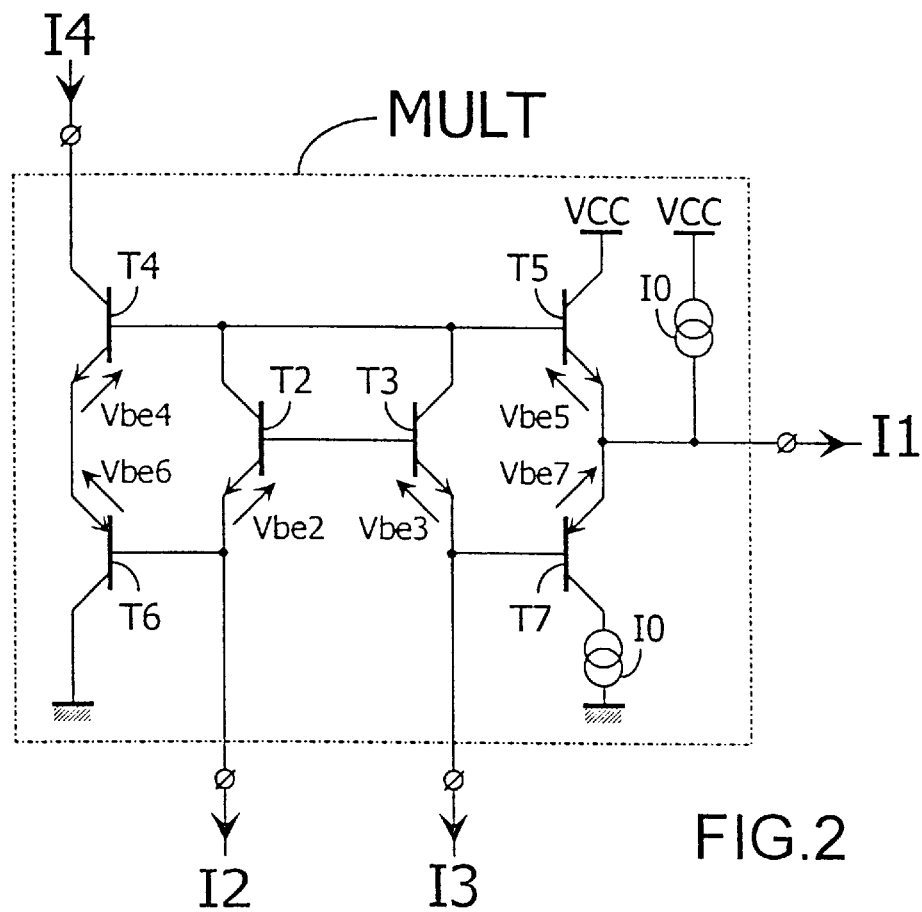
Figure 3:
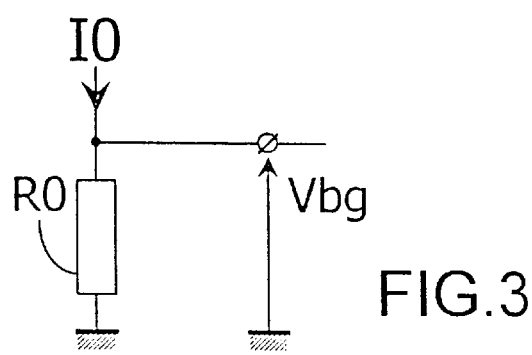
Figure 4:
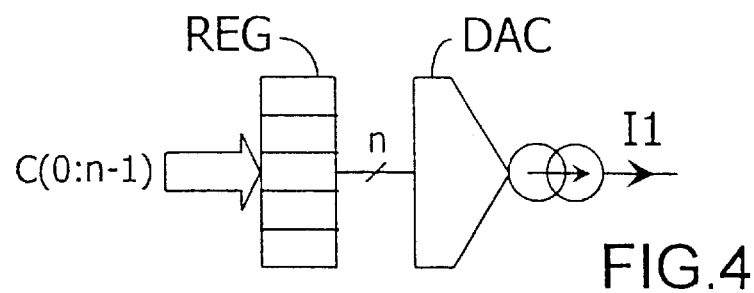

The invention will be more fully understood with the aid of the following description, given by way of non-limitative example, with reference to the accompanying drawings, in which:

FIG. 1 is a functional diagram which partly represents an information reading device in accordance with an embodiment of the invention, FIG. 2 is an electrical diagram which represents a current multiplier included in such a reading device, FIG. 3 is an electrical diagram which represents a current source used in such a current multiplier, and FIG. 4 is a functional diagram which represents a preferred variant of a control input of the control loop.

FIG. 1 is a functional diagram which partly represents an information reading device in accordance with a special embodiment of the invention. This device has at least one read head comprising at least one magnetoresistive bar MR intended for generating pulses, referred to as data pulses, which are representative of information read by the head. The device includes a control loop for controlling the power dissipated in the magnetoresistive bar Mr. The control loop has a time constant which is large with respect to the duration of the data pulses and is controlled by a control signal whose value is representative of a so-called regulated value of the power which is to be dissipated by the bar. The control loop comprises regulating means for simultaneously controlling the value of a current Imr flowing through the magnetoresistive bar MR and the value of a voltage Vmr appearing across said bar MR. In the present embodiment of the invention these regulating means comprise a first comparator CMP1 and a first transistor T1, whose conduction is controlled by the output signal of the comparator CMP1, which transistor T1 has its main current path arranged in series with the magnetoresistive bar MR, as a result of which the current Imr can flow through said main current path.

In this embodiment of the invention the control loop includes a current multiplier MULT intended for receiving a first current I1 representing the control signal, a second current I2 representing the current flowing through the magnetoresistive bar MR, and a third current I3 representing the voltage Vmr appearing across said bar MR, which multiplier MULT serves for generating a fourth current I4 having a value whose square is proportional to the quotient of the values of the second and the third current I2 and I3, multiplied by the value of the first current I1.

The current multiplier MULT enables to generate a signal, formed by the fourth current I4, whose value is independent of the electrical parameters which govern the operation of the device and, particularly, of the bias current Imr and bias voltage Vmr of the magnetoresistive bar MR. With the aid of this signal, which is exclusively representative of the regulated value, referenced Preg, and of the quiescent resistance, referenced Rmr, the regulating means can easily be controlled. Indeed, two methods can be used for controlling the power dissipated by the magnetoresistive bar MR. Each of them is based on an interpretation of Ohm's law. In accordance with a first method, the regulated value Preg is equal to the product between the voltage Vmr across the magnetoresistive bar MR and the current flowing through said bar. A current I4' which should serve for controlling the regulating means, similarly to the fourth current I4, is therefore written as I4' =Preg/Vmr. The voltage Vmr is subject to variation and a control loop using this signal as a basic parameter is likely to become unstable. The second method, which is implemented by means of the current multiplier MULT in the embodiment described with reference to FIG. 1, is more advantageous because it does not have the risk of instability described above. This method is based on the fact that the regulated value Preg is equal to the product of the quiescent resistance Rmr and the square of the current Imr which flows through the magnetoresistive bar. Thus, the square of the current I4 is written as $I4^2$= Preg/Rmr. Since the regulated value is fixed, and since the quiescent resistance is a fixed physical quantity because it is intrinsic of the magnetoresistive bar, the value of the signal I4 which controls the regulating means is fixed, which contributes considerably to the stability of the control loop. The second current I2 is a reproduction of the current Imr flowing through the magnetoresistive bar MR and is obtained via a current mirror M1 which multiplies by a coefficient k, yielding: I2 =k.Imr. The third current I3 is proportional to the voltage Vmr present across said bar MR: I3 =k'.Vmr/R0, the value of the constant k' being dependent on the gain factors of a second comparator CMP2 and of a transistor T0, which are used for generating the third current I3 in accordance with a technique which is well-known to those skilled in the art. The square of the value of the fourth current I4 generated by the multiplier MULT is proportional to the quotient of the second and the third current I2 and I3, multiplied by the value of the first current I1, which is written as $I4^2$=k".I1.(I2/I3). Substitution of the values for the second and the third current I2 and I3 in the last expression yields $I4^2$=k.k".(Imr.R0)/(Vmr.k'). According to Ohm's law, Vmr=Rmr.Imr, so that $I4^2$=k.k".I1.R0/(Rmr.k'). If the current I1 is proportional to a value P0 representing the regulated value Preg, this yields $I4^2$=K. P0/Rmr, where K is a multiplying constant which integrates the constants k, k' and k" as well as the resistance R0. The current multiplier MULT thus produces a control signal for the regulating means, which signal is formed by the current I4 and depends solely on the regulated value Preg and on the value of the quiescent resistance Rmr. The basic advantage of the invention is highlighted particularly in this embodiment, because the value of the quiescent resistance Rmr, though unknown, implicitly plays a part in the power control, as a result of which it need not be measured for biasing the magnetoresistive bar MR.

The regulating means operate as follows: the value of the fourth current I4 supplied by the current multiplier MULT is that which the bias current Imr flowing through the magnetoresistive bar MR should have in order to ensure that the value of the power dissipated by said bar is equal to the regulated value Preg. If the bias current Imr is smaller than the fourth current I4, a voltage V−present on the inverting terminal of the first comparator CMP1, and written as V−=VCC−R1.I4, is smaller than a voltage V+present on the non-inverting terminal of the first comparator CMP1, and written as V+=VCC−R1.Imr. The first comparator CMP1 then produces a voltage on its output, which is connected to the base of the transistor T0, which voltage causes the conduction of said transistor T0 to increase. The bias current Imr, as well as the bias voltage Vmr, then increase until the value of the bias current Imr becomes equal to that of the fourth current I4. The power control loop then reaches its equilibrium, so that Imr=I4 and, consequently, Rmr.Imr= K.P0. If P0 =Preg/K is chosen, the value of the power dissipated in the magnetoresistive bar MR, Rmr.Imr, is equal to the regulated value Preg. The bias voltage Vmr is stored via the capacitance C, whose value defines the time constant of the control loop. In present integrated circuit fabrication technologies, a value C of the order of 150 pF, for example, yields a time constant of the order of 100 ms, which is adequate in order not to disturb the data pulses.

The first comparator CMP1 is suitably realized in such a manner that its transfer characteristic will be non-linear, i.e. small differences between the voltages on the inverting terminal V− and the non-inverting terminal V+ will generate only small variations in the output signal of the first comparator CMP1, while large differences between the voltages on the inverting terminal V− and the non-inverting terminal V+ will generate large variations in the output signal of the first comparator CMP1.

FIG. 2 is an electrical diagram which shows a variant of the current multiplier MULT. It is evident that other variants exist and are conceivable to those skilled in the art. In the present variant, the multiplier MULT comprises:

a second and a third transistor T2 and T3 of the NPN type, having their bases coupled together, having their collectors coupled together, and having their emitters intended to receive the second and the third current I2 and I3, a fourth and a fifth transistor T4 and T5 of the NPN type, having their bases coupled together to the collectors of the second and the third transistor T2 and T3, the collector of the fourth transistor T4 being intended to supply the fourth current I4, the collector of the fifth transistor T5 being coupled to a positive supply terminal VCC, and a sixth and a seventh transistor T6 and T7 of the PNP type, having their emitters coupled to the respective collectors of the second and the third transistor T2 and T3, the collector of the sixth transistor T6 being coupled directly to ground, the collector of the seventh transistor T7 being coupled to ground via a current source I0, the node between the emitters of the fifth and the seventh transistor T5 and T7 forming an input intended for receiving the first current I1, said input being further coupled to the positive supply terminal VCC via another current source I0.

The operation of the multiplier MULT is based on the following equations: On the one hand, $\Sigma Vbei=0$, where Vbei is the base-emitter voltage of the transistor Ti and, on the other hand, $Vbei=V_T.\ln(Ici/Ios)$, where $V_T$ is equal to the product of Boltzmann's constant and the absolute temperature divided by the elementary charge, Ici being the collector current of the transistor Ti and Ios being a constant current whose value is related directly to the area of the transistor Ti. Since the transistors forming the multiplier MULT have substantially equal dimensions and the second and the third current I2 and I3 are equal to k.Imr and k'.Vmr/R0, the expert can readily express the fourth current I4 as $I4^2$= K1.R0.I0.I1.Imr/Vmr, or $I4^2$=K1.R0.I0.I1/Rmr because Vmr=Rmr.Imr, K1 integrating the constants k and k'.

FIG. 3 shows a variant of current sources I0. Each of said sources comprises a resistor R0, subjected to a voltage Vbg, which is suitably supplied by a voltage generator of the band-gap type and is therefore constant and temperature independent. Thus, I0 =Vbg/R0, and for I4 the following expression is obtained: $I4^2$=K1.Vbg.I1/Rmr, or $I4^2$=K.P0/ Rmr because the current I1 is proportional to a value P0 representing the regulated value Preg.

FIG. 4 illustrates a method of deriving the first current I1 form a control signal C(0:n−1) of a digital nature. This control signal C(0:n−1) is stored in an n-bit register REG, is subsequently converted to analog form by means of a digital-to-analog converter DAC, which supplies the first current I1. It will then suffice to insert between the converter DAC and the multiplier a current mirror, not shown in the Figure, so that the multiplier receives the first current I1 in the appropriate direction. This preferred embodiment of the invention makes it possible to program the regulated value Preg digitally, which is particularly advantageous in view of applications in the field of hard disks for computers, in which information is conveyed in digital form.

What is claimed is:

1. A device for reading magnetic information, which device has at least one read head comprising at least one magnetoresistive bar for generating data pulses which represent information read by the head, characterized in that:

the device includes a control loop for controlling the power dissipated in the magnetoresistive bar, the control loop is controlled by a control signal whose value is representative of a regulated value of the power which is to be dissipated by said bar, and includes regulating means for simultaneously regulating the value of a current flowing through the magnetoresistive bar and the value of a voltage present across said bar, and a current multiplier arranged to receive a first current representative of the control signal, a second current representative of the current flowing through the magnetoresistive bar, and a third current representative of the voltage present across said bar, said multiplier generating a fourth current having a value whose square is proportional to the quotient between the values of the second and third currents, multiplied by the value of the first current, and the control loop has a time constant which is large with respect to the duration of the data pulses.

2. A device for reading magnetic information, as claimed in claim 1, characterized in that the control signal is of a digital nature, and the control loop includes a register for storing the value of the control signal, and a digital-to-analog converter receiving the content of said register and converting said content into an analog current forming the first current.

3. A device for reading magnetic information, as claimed in claim 2, characterized in that the regulating means comprises a comparator supplying an output signal representative of the difference between the fourth current and the current flowing though the magnetoresistive bar, and a transistor whose conduction is controlled by the output signal of the comparator, which transistor has its main current path arranged in series with the magnetoresistive bar.

4. A device for reading magnetic information, as claimed in claim 3, characterized in that the control loop includes a capacitive element for storing the value of the output signal of the comparator, which capacitive element has a value which is large enough to ensure that the duration of the data pulses is negligible with respect to the time constant of the control loop.

5. A device for reading magnetic information, which device has at least one read head comprising at least one magnetoresistive bar intended for generating data pulses which represent information read by the head, characterized in that it includes means for applying a d.c. bias to said bar, and a control loop for controlling the power dissipated in the magnetoresistive bar, the control loop having a time constant which is large with respect to the duration of the data pulses.

6. A device for reading magnetic information, as claimed in claim 5, characterized in that the control loop includes regulating means for simultaneously regulating the value of a current flowing through the magnetoresistive bar and the value of a voltage present across said bar, the control loop being controlled by a control signal whose value is representative of a regulated value of the power which is to be dissipated by said bar.

7. A device for reading magnetic information, as claimed in claim 5, characterized in that the d.c. bias is a d.c. current, and said data pulses are voltage pulses.

8. A device for reading magnetic information, as claimed in claim 5, characterized in that the d.c. bias is a d.c. voltage, and said data pulses are current pulses.

9. A device for reading magnetic information, as claimed in claim 5, characterized in that the control loop is controlled by a control signal whose value is representative of a regulated value of the power which is to be dissipated by said bar, and includes regulating means for simultaneously regulating the value of a current flowing through the magnetoresistive bar and the value of a voltage present across said bar, and a current multiplier arranged to receive a first current representative of the control signal, a second current representative of the current flowing through the magnetoresistive bar, and a third current representative of the voltage present across said bar, said multiplier generating a fourth current having a value whose square is proportional to the quotient between the values of the second and third currents, multiplied by the value of the first current.

10. A device for reading magnetic information, as claimed in claim 9, characterized in that the control signal is of a digital nature, and the control loop includes a register for storing the value of the control signal, and a digital-to-analog converter receiving the content of said register and converting said content into an analog current forming the first current.

11. A device for reading magnetic information, as claimed in claim 10, characteriznd in that the regulating means comprises a comparator supplying an output signal representative of the difference between the fours Hunt and the current flowing though the magnetoresistive bar, and a transistor whose conduction is controlled by the output signal of the comparator, which transistor has its main current path arranged in series with the magnetoresistive bar.

* * * * *

Disclaimer 6,449,113—Patrick Leclerc, Caen, (FR) Eric Pierearts, Caen, (FR); Joao N.V. L. Ramalho, Biéville-Beuville (FR); Jean Barbotin, Caen, (FR); Johannes O. Voorman, Eindhoven, (NL). DEVICE FOR READING MAGNETIC INFORMATION. Patent dated September 10, 2002. Disclaimer filed March 28, 2008, by the assignee, Koninklijke Philips Electronics N.V.

Hereby enters this disclaimer to all claims of said patent.

*(Official Gazette October 7, 2008)*